United States Patent
Provot et al.

(10) Patent No.: US 6,669,893 B1
(45) Date of Patent: Dec. 30, 2003

(54) METHOD FOR MAKING NEUTRON ABSORBER MATERIAL

(75) Inventors: Bruno Provot, Meximieux (FR); Xavier Deschanels, Le Pin (FR); Philippe Bry, Palaiseau (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/926,100

(22) PCT Filed: Mar. 2, 2000

(86) PCT No.: PCT/FR00/00521

§ 371 (c)(1),
(2), (4) Date: Sep. 28, 2001

(87) PCT Pub. No.: WO00/52704

PCT Pub. Date: Sep. 8, 2000

(30) Foreign Application Priority Data

Mar. 3, 1999 (FR) ............................................ 99 02631

(51) Int. Cl.[7] ............................................. C04B 33/32
(52) U.S. Cl. ........................................ 264/642; 264/674
(58) Field of Search ................................. 264/642, 674

(56) References Cited

U.S. PATENT DOCUMENTS 5,024,813 A * 6/1991 Nishiyama et al.
5,242,622 A * 9/1993 Boutin et al. ............... 252/478

FOREIGN PATENT DOCUMENTS

| EP | 0 087 926 | | 9/1983 |
| EP | 0 087 927 | | 9/1983 |
| EP | 0 359 683 | | 3/1990 |
| JP | 61-77794 | * | 9/1984 |
| WO | WO 94/28556 | | 12/1994 |

OTHER PUBLICATIONS

Derwent Abstract, AN 1991-012861, SE 8 901 091, Sep. 30, 1990.
Derwent Abstract, AN 1988-031544, JP 62-289792, Dec. 16, 1987.
Derwent Abstract, AN 1987-280513, JP 62-194497, Aug. 26, 1987.

* cited by examiner

Primary Examiner—Christopher A. Fiorilla
(74) Attorney, Agent, or Firm—Oblon, Spivak, McClelland, Maier & Neustadt, P.C.

(57) ABSTRACT

A neutron absorbent material and a process for manufacturing said material, the neutron absorbent material having great resistance to mechanical damage and more particularly great resistance to crack propagation, which material contains boron carbide and hafnium in the form of powders of fine grain size, and with the manufacturing process it is possible, by reactive sintering of the two powders, to obtain a boron carbide based material having hafnium boride strata, which process comprises a step consisting of mixing boron carbide and hafnium and a reactive sintering step of the mixture obtained.

10 Claims, 2 Drawing Sheets

METHOD FOR MAKING NEUTRON ABSORBER MATERIAL

This application is a 371 of PCT/FR00/00521 filed Mar. 2, 2000.

FIELD OF THE INVENTION

The invention relates to a composite neutron absorbent material and to a process for manufacturing this material.

Neutron absorbent materials are neutron absorbers. They find application in the manufacture of control rods for example used to control the reactivity of nuclear reactors, in particular to control pressurized water nuclear reactors (PWR) and fast neutron reactors (FNR).

Inside the cores of nuclear reactors, neutron absorbent materials are indispensable components of the control rods. The latter form the command, adjustment and stoppage systems of reactor reactivity.

The materials which make up these control rods contain nuclides able to absorb the neutrons in order to reduce the reactor's neutron flow.

These neutron-absorbing materials may for example be used in the two main types of French nuclear reactors: Pressurized Water Reactors and Fast Neutron reactors.

The first choice that a core designer must face is which neutron-absorbent nuclide to use. It must meet the requirements of anti-reactivity related to the energy rating of the core: type of fuel and fuel assembly, desired neutron flow, nuclear station power, etc. Depending upon desired core power, upon the intensity of the neutron flow, it is essential to provide the necessary antireactivity for normal adjustment of this neutron flow or possibly for the emergency stoppage of nuclear fission reactions. During the fission of a heavy nucleus in the core of a nuclear reactor, a few neutrons are released in the free state. If, among these neutrons that are released, some happen to meet a fissile nucleus and cause its fission they in turn generate descendants which themselves may cause the fission of another nucleus and give birth from generation to generation to a chain reaction. It therefore appears important to control the quantity of free neutrons formed in order to prevent the fission reaction from racing out of control and to maintain this fission in a critical state, that is to say in equilibrium.

Therefore the control rods containing the neutron absorbent materials are mobile rods mounted in the core of nuclear reactors such that they can slide between the fuel assemblies, or mounted in a network of fuel pins of an assembly. Control of core fission is made by inserting or withdrawing these rods from the core of the nuclear reactor by sliding them in or out of position.

The absorbent materials may be used to maintain nuclear fission in the critical state, in which case they form piloting rods. They may also be used to ensure quick stoppage of a chain reaction in which case they form safety rods.

Other criteria may be taken into account in the choice of absorbent material. These criteria are:

good mechanical properties, in particular a Young's modulus that is as low as possible, moderate ultimate stress, good resistance to mechanical damage and more particularly good resistance to crack propagation, a reasonable overall cost (raw material and manufacture), good chemical and shrinkage resistance to radiation optionally, chemical compatibility with the cladding (generally in stainless steel) which may be used to shield the absorbent.

A great amount of research had been conducted on boron carbide $B_4C$ with the sole view to its use as neutron absorber given its high effective neutron capture cross-section. $B_4C$ absorbent material is used in the form of stacks of sintered cylindrical pellets, made from powders.

Although having substantial chemical inertia, $B_4C$ oxides easily on and after 600° C. in the presence of oxygen. This compound is also sensitive to water corrosion in the primary PWR medium, in particular when radiated by the neutrons or when subjected to neutron radiation. This is one of the reasons why it is generally inserted in stainless steel cladding.

Also, the lifetime of boron carbide never reaches the theoretical limit fixed by boron exhaustion on account of damage to the material caused by the large quantity of helium and lithium formed by neutron absorption $^{10}B(n,\alpha)$, Li. Therefore, under the effect of temperature, one fraction of the helium formed diffuses outside the material while the other accumulates therein, causing swelling and micro-fracturing of the material.

In the particular case of fast neutron reactors, the flow of neutrons (energy greater than 1 MeV) penetrates inside all the absorbent material which causes a volume release of heat whereas the surface of the absorbent is directly cooled by sodium. A substantial radial thermal gradient therefore occurs in the material, which may reach several hundred degrees per centimeter. This thermal gradient involves major tangential heat stresses in the material which cause critical radial cracking and complete fragmentation of the absorbent material.

In the particular case of pressurized water reactors, the flow of neutrons (energy less than a few eV) only penetrates the peripheral part of the absorbent material. The swelling described previously therefore only occurs in a peripheral ring of the absorbent. Differential swelling therefore occurs between the circumference and the core of the absorber pellets which causes major radial stresses, critical tangential cracking superimposing itself upon the micro-cracking previously described, and complete fragmentation of the absorbent material.

The combination of swelling, microfracturing and cracking of the material may, under strong radiation, cause a mechanical interaction between the absorbent material and the steel cladding which may lead to fracture of the cladding which itself is subject to weakening firstly by fast neutron radiation and secondly by the diffusion of a certain amount of boron and carbon derived from the absorbent material.

These two modes of critical cracking are macroscopic crack phenomena with imposed strain.

It is therefore necessary to develop a neutron absorbent material which may be used in these two types of reactors.

This material therefore, in addition to the above-mentioned properties of a low Young's modulus and a low coefficient of thermal expansion, must offer high heat conductivity, toughness, resistance to crack propagation and resistance to mechanical damage.

Document EP-A-0 359 683 describes a neutron absorbent pellet and its process of manufacture. It describes a scarcely absorbent element obtained by moulding or sintering a mixture of ceramic powders ($B_4C$, $HfO_2$, $Eu_2O_3$) and metal (Hf, Eu, Ni, Cr).

Document WO-A-94/28556 describes a neutron absorbent material and its method of preparation. The material described contains boron carbide and may contain hafnium, in particular hafnium diboride. The hafnium diboride represents no more than 40% by volume, preferably from 20 to 30% by volume.

DISCLOSURE OF THE INVENTION

The purpose of the present invention is precisely to remedy the above-mentioned disadvantages and to provide a neutron absorbent material having all the required properties, in particular for its use in control rods for a nuclear reactor.

The neutron absorbent material of the present invention is characterized in that it contains boron carbide and hafnium, in particular it may contain boron carbide and hafnium diboride.

According to the invention, the boron may account for at least approximately 65% by atoms of the material, for example approximately 72% by atoms of the material.

According to the invention, the hafnium may account for up to approximately 18% by atoms of the material, for example approximately 10% by atoms of the material.

According to the invention, the boron carbide may be in the form of particles having a diameter of up to approximately 50 μm.

According to the invention, the hafnium may be in the form of agglomerates of hafnium boride whose size preferably ranges up to approximately 500 μm, for example up to approximately 250 μm.

The material of the present invention may have a density of approximately 2870 to 6800 kg/m$^3$, for example of approximately 3220 to 5770 kg/m$^3$, for example of 5165 kg/m$^3$ or 5060 kg/m$^3$.

The material of the present invention may also contain carbon and/or traces of hafnium carbide.

The material of the present invention may also contain zirconium representing up to approximately 4% by weight of the hafnium fraction. The zirconium may be an impurity present in the hafnium, and may represent up to 4% by weight of the hafnium.

The present invention also relates to a control rod for a nuclear reactor containing a neutron absorbent material according to the present invention.

The control rods may be command, adjustment and reactivity stoppage rods for nuclear reactors. The neutron absorbent material of the present invention may, for example, be used in all the above-mentioned applications.

The present invention also concerns a process for manufacturing a neutron absorbent material, said neutron absorbent material being a composite material containing boron carbide and hafnium diboride. The boron carbide and hafnium diboride may be the main components of the material of the invention.

This process comprises the following steps:

adding hafnium powder to a powder of boron carbide, mixing the boron carbide powder and the hafnium powder in homogeneous manner, and sintering the homogeneous mixture obtained at a sintering pressure and temperature that are sufficient to obtain the composite material.

According to the process of the invention, between 15 and 40% by volume of hafnium may be added, for example between 20 and 30% by volume of hafnium, for example around 25% by volume of hafnium. It is also to be noted at this point that the hafnium may contain a weight fraction of zirconium of up to 4% by weight of the hafnium, the zirconium possibly being an impurity usually found in hafnium. The homogeneous mixture of the powders of boron carbide and hafnium, represents 100% by volume of the mixture.

According to the process of the invention, the boron carbide powder may preferably have a grain size of up to approximately 50 μm.

According to the process of the invention, the hafnium powder may preferably have a grain size of up to approximately 20 μm, further preferably of up to approximately 10 μm.

According to the process of the invention, the mixture of boron carbide powder and hafnium powder may be made using any means known to persons skilled in the art to obtain a homogeneous mixture of said powders. Preferably, the mixture of these powders may be made by simultaneous application of mechanical stirring and ultrasound, or simply by application of ultrasound to a paste containing said powders dispersed in a dispersion liquid.

The dispersion liquid is preferably a liquid which, after the mixing of the powders, may be easily removed by evaporation for example. This dispersion liquid may, for example, be an alcohol such as ethanol.

When a homogeneous mixture of the powders is obtained, it may be dried by alcohol evaporation for example, and then screened in order to remove any powder aggregates in the mixture.

The homogeneous mixture obtained is then sintered to obtain the composite material.

According to the invention, sintering may be conducted in a vacuum or in any atmosphere made up of a neutral gas, preferably argon for example.

According to the invention, the mixture may be sintered in any appropriate mould for sintering such powders, for example a mould in graphite preferably lined with a sheet of graphite. Lining of the mould particularly prevents diffusion of the chemical species in the mixture towards the mould and facilitates subsequent release of the composite material from the mould.

The mould may be of appropriate shape to mould the material in pellet, plate, cruciform or pin shape and generally in a shape appropriate for forming control rods of a nuclear reactor.

Sintering of the mixture is advantageously conducted under conditions of temperature, pressure and time which enable proper densification of the composite material, it may for example be conducted at a temperature of approximately 1800 to 2100° C., for example at a temperature of around 2000° C., under a pressure of 70 to 110 MPa, for example from 90 to 100 MPa, for example of around 92 MPa, for a time of approximately 15 to 90 minutes, for example for approximately 1 hour.

Sintering may, for example, be conducted in a furnace maintained in a dynamic vacuum.

Sintering pressure may be applied before the reaction which occurs in the mixture of the boron carbide and hafnium powders. Therefore, the pressure may be applied before the temperature of the powder mixture reaches the sintering reaction temperature of said mixture, for example when the temperature of the mixture and the mould is approximately 20 to 1200° C., for example around 500 to 1000° C., or further at approximately 800° C. for example.

Under these conditions, reactive sintering in the powder mixture, thermal contact between the boron carbide and hafnium powders and the composition, and the morphology of the composite material are accurate. In addition, the densification of the composite material of the present invention is most satisfactory.

One first advantage of the neutron absorbent material of the invention is that it offers greater resistance to crack propagation.

Another advantage of the material of the invention is that it maintains its geometrical intactness despite major mechanical damage. For the composite material of the invention does not fragment when subjected to a strong heat gradient, swelling, microfracturing or cracking.

A further advantage according to the invention was demonstrated by biaxial bending tests performed on sample disks of pure boron carbide material. These tests showed that the fracture behaviour of pure boron carbide was solely fragile, leading to fragmentation of the material. With the composite material of the invention, fracture behaviour is pseudo-plastic and dissipating: it does not lead to fragmentation of the composite material of the invention which, after mechanical damage, remains in a single block even if microfractured or cracked. This result indicates a Young's modulus of the composite material of the present invention that is lower than that of pure boron carbide, to an elongation to fracture of the composite material of the present invention that is greater than that of pure boron carbide, and to a Weibull's modulus of the composite material of the present invention that is greater than that of pure boron carbide, and hence indicates lesser dispersion of fracture probability in relation to a given stress which may occur in the material.

Another advantage of the invention was shown by comparative double-torsion tests on sample plates of pure boron carbide and a material of the invention. These tests showed pure boron carbide to have solely fragile crack behaviour with intragranular cracking. For the composite material of the invention, crack behaviour showed phenomena of repeated crack blocking, phenomena of crack deflection, and crack bridging phenomena in the composite structure of the material of the invention. The result was resistance to crack propagation and toughness of the composition material of the present invention that was greater than that of pure boron carbide. This result also shows an R curve effect exhibited by the composite material of the present invention through the double torsion test.

A further advantage of the invention was shown by heat gradient cracking tests on sample disks of pure boron carbide and sample disks of the material of the present invention. These tests showed solely fragile cracking and instantaneous intragranular cracking with the pure boron carbide material. Pure boron carbide cannot withstand a heat gradient representing the heat gradient which occurs under radiation in a fast neutron reactor. This is due to the thermo-mechanical stresses induced by the heat gradient which exceed the crack propagation resistance of pure boron carbide and causes fragmentation of the sample of pure boron carbide. With the composite material of the present invention, cracks also occurred in the sample disks but they were blocked by the structure of the material of the invention. The sample disks of the composite material of the present invention remained in a single piece. The cracks were shorter as their growth was blocked by the presence of agglomerates of hafnium boride which limited their propagation. This result is the effect of the heat conductivity, resistance to crack propagation and toughness of the composite material of the present invention which are greater than those of pure boron carbide, and of an R curve effect exhibited by the composite material of the present invention with the double-torsion test.

The composite absorbent material of the invention may, for example, be described as containing a homogeneous matrix of boron carbide ($B_4C$) in which agglomerates are distributed in homogeneous manner which contain hafnium monoboride (HfB), hafnium diboride ($HfB_2$) and traces of hafnium carbide (HfC). Zones of free carbon (C) can be detected on the interface between the matrix and the agglomerates, preferably this free carbon phase does not exceed 10% by weight of the boron carbide phase. The added hafnium therefore develops into hafnium boride phases present in the composite in the form of agglomerates.

The hafnium boride also offers the advantage of having very satisfactory reaction to neutron radiation which is better than that of boron carbide in terms of accommodation of strain, radiation defects and microfracturing.

The type of the agglomerate phases during reactive sintering may therefore be of importance in understanding the advantage of the composite material of the invention.

The phases of hafnium boride in the composition of the present invention have the appearance of agglomerates. These agglomerates in the composite material of the invention provide the composite material with the capacity to resist against crack propagation and to maintain its physical intactness despite the slow, progressive lowering of its mechanical characteristics.

Other characteristics and advantages will be further seen on reading the following examples which are evidently given for illustrative purposes and are not restrictive, with reference to the appended figures.

EXAMPLE 1

Figure 1:
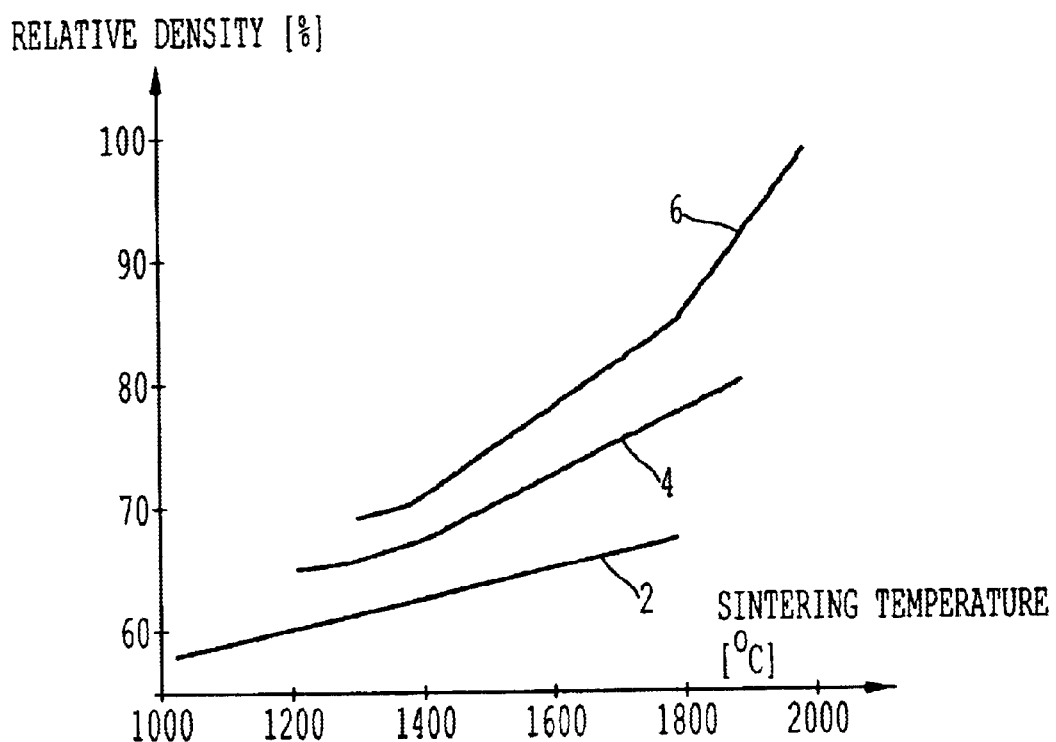
FIG. 1 is a graphical representation of the influence of the sinter cycle on the sintering temperature of a mixture of $B_4C$ and Hf powders according to the present invention.

Manufacture of a Composite Material According to the Invention 18.9 g of boron carbide powder having an average grain size of less than 50 μm were mixed with 32.75 g of hafnium having an average grain size of less than 20 μm, that is 75% by volume of boron carbide and 25% by volume of hafnium.

The mixture was made as homogeneous as possible through the application of ultrasound to a paste made of the two powders dispersed in ethanol.

The mixture was then dried in a drying oven heated to 80° C., then screened with a screen of 60-micron mesh size. 2.5 g of this mixture were placed in a graphite mould 9.5 mm in diameter. Two pistons in graphite plugged the end of the mould previously lined with a sheet of graphite having a thickness of 0.5 mm and allowing pressure to be applied to the powder.

The mixture and mould assembly were brought to 2000° C. under a pressure of 92 MPa for one hour in a furnace maintained in a dynamic vacuum. The pressure of 92 MPa was applied when the temperature of the mould and mixture assembly reached 800° C. and it was maintained for the duration of the temperature rise and throughout the one hour stage. Pellets of 8.5 mm in diameter were obtained and 8.5 mm in height after machining with a diamond tool. The pellets showed a final density of 98% of theoretical density, that is a density of 5060 kg/m$^3$.

EXAMPLE 2

Application of Pressure at Low Temperature to Obtain the Composite of the Invention Under the same conditions as in example 1, different mixtures of boron carbide and hafnium powders were sintered with different sintering cycles.

The sintering cycle may be defined by a certain number of parameters:

sintering temperature: this is the maximum temperature reached during sintering, chosen to obtain the density, the composition and the morphology of the composite of the invention, sintering time: the time during which the mixture is maintained at sintering temperature, sintering pressure: the pressure applied to the mixture during the sintering time, pressurizing temperature of the mixture; the temperature at which the pressure is applied to the mixture.

For each of these sintering operations, the density of the composite material obtained was measured and its composition successively identified by X-ray diffraction after sintering the composite.

For each mixture a relative density (rd) was measured as a percentage of the composite material obtained after sintering, by calculating the ratio of the measured density and the theoretical density after sintering.

Table 1 below groups together the results of this example.

TABLE 1

| Sintering temperature in ° C. | | 1000 | 1200 | 1300 | 1400 | 1800 | 1900 | 2000 |
|---|---|---|---|---|---|---|---|---|
| Pressurizing at sinter temperature and sintering pressure of 60 MPa | rd as % | 58 | 60 | 61 | — | 67 | — | 70 |
| Pressurizing at sinter temperature and sintering pressure of 110 MPa | rd as % | — | 65 | — | 68 | — | 80 | 83 |
| Pressurizing at 800° C. and sintering pressure of 92 MPa | rd as % | — | 68 | 69 | — | 85 | — | 99 |

In FIG. 1, the values of FIG. 1 are plotted to form a relative density graph as a % of composite material relative to sintering temperature, with 60 MPa sinter pressure applied at sinter temperature: curve denoted 2, with 110 MPa sinter pressure applied at sinter temperature: curve denoted 4, and finally with low temperature pressurization at 800° C. with a sinter pressure of 92 MPa: curve denoted 6.

This figure shows the influence of the sinter cycle parameters and of sintering. temperature on a mixture of boron carbide and hafnium according to the invention.

The results of this example generally show that the temperature at which pressure is applied the mixture may be essential to obtain the composite of the invention having relative densities varying between 80 and 99% of the theoretical density of the initial mixture after reactive sintering.

Different composite materials of the invention 20 were analysed by X-ray diffraction. These composite materials were obtained with pressurization at low temperature and a sintering pressure of 92 MPa for increasing sinter temperatures: 1000° C., 1200° C., 1400° C., 1800° C., 1900° C. and 2000° C. Analysis of X-ray diffraction spectra made it possible to follow the changes in the chemical composition of the composite of the invention in relation to sintering temperature. With this analysis, the different phases present in the composite of the invention could be identified in order to obtain the most favourable chemical composition for improved performance under neutron radiation.

The results are summarized in table 2 below:

TABLE 2

| Sinter temperature in ° C. | Type of phases present in the composite material of the invention |
|---|---|
| 1000 | Boron carbide $B_4C$ |
| | Hafnium Hf |
| | Hafnium monoboride HfB |
| | Hafnium carbide HfC |
| | Hafnium diboride $HfB_2$ |
| 1200 | Boron carbide $B_4C$ |
| | Hafnium Hf |
| | Hafnium diboride $HfB_2$ |
| | Hafnium monoboride HfB |
| | Hafnium carbide HfC |
| | Carbon C |
| 1400 | Boron carbide $B_4C$ |
| | Hafnium diboride $HfB_2$ |
| | Hafnium monoboride HfB |
| | Hafnium Hf |
| | Hafnium carbide HfC |
| | Carbon C |
| 1800 | Boron carbide $B_4C$ |
| | Hafnium diboride $HfB_2$ |
| | Hafnium monoboride HfB |
| | Carbon C |
| | traces: |
| | Hafnium Hf |
| | Hafnium carbide HfC |
| 1900 | Boron carbide $B_4C$ |
| | Hafnium diboride $HfB_2$ |
| | Carbon C |
| | traces: Hafnium monoboride HfB |
| 2000 | Boron carbide $B_4C$ |
| | Hafnium diboride $HfB_2$ |
| | Carbon C |

These results generally show that, at the outset, when the conditions of thermal contact between the two boron carbide and hafnium phases in the initial mixture of powders are in accordance with those of the present invention, a set of chemical reactions occurs during sintering which involves changes in the chemical composition of the material of the invention.

A further effect of the mode of sintering the composite material of the invention is the structure which forms during sintering. It is in the form of a matrix of boron carbide and agglomerates of a hafnium boride phase which imparts improved heat conductivity to the material and improved fracture and crack behaviour as described in particular in examples 3 and 4 below.

EXAMPLE 3

Evaluation of the Resistance to Mechanical Damage of a Composite Material According to the Invention Ultimate stress is the macroscopic magnitude characterizing the yield strength of a material. It is the critical value of the maximum stress calculated on a test-piece of the material under consideration. This ultimate stress is related to critical defects involved in the yield of the structure according to Griffith's theory.

Elongation to fracture is the macroscopic magnitude which represents the elongation or strain of a test-piece when fracture of the latter occurs, that is to say when the ultimate stress is reached.

Young's modulus is the macroscopic magnitude characterizing the elasticity of a homogeneous, isotropic material. When characterizing a material, Young's modulus of the material is the ratio of the stress calculated in the material to corresponding strain. Young's modulus is also the sloping straight line representing stress evolution calculated in a sample and the measured corresponding strain.

The biaxial bending test chosen in our case was used to test a material under planar stress whose test-pieces are in the form of disks of narrow thickness (thin plate theory). Load is transmitted via a central bead (point contact) on the upper surface of the test-piece of the material to be tested. With this configuration, it is possible to obtain an axisymmetrical area of uniform stresses at the centre of the test-piece of material to be tested. The test-piece is supported by three beads distributed around a circle whose centre is positioned in the extension of the load line. The test has the advantages of easy, reliable test-piece preparation, low experimental dispersion of measurements (reduced edge effects and uniform load area) and of material testing in biaxial mode.

This test is used to measure the load placed on the test-piece and its deflection during the test. During biaxial bending under load of the test-piece, the continuous recording of the variation in deflection relative to the load applied is used to assess Young's modulus throughout the elastic regimen. When the load reaches a sufficient critical value to cause breakage of the test-piece, this critical load is used to calculate the ultimate stress of the material, and the deflection is used to determine the elongation or strain to fracture (elongation or strain corresponding to the time of fracture).

The material in pure boron carbide is solely elastic: Young's modulus is a constant which suffices to describe the entire curve representing stress evolution relative to strain up to the time of fracture; for this material, the curve is a simple, monotonous, continuous straight line.

It is also fragile: fracture occurs instantly and leads to the collapse of all the characteristics of the material (Young's modulus and ultimate stress), it is no longer possible to apply a load to this material since it no longer offers any mechanical resistance. The curve representing deflection relative to load (or of load relative to deflection) is a monotonous, continuous straight line which suddenly ends at the time of fracture of the test-piece. The elastic energy stored during loading of the test-piece is suddenly returned on breaking, and leads to fragmentation of the test-piece.

On the other hand, the performance of the material of the present invention is pseudo-plastic: Young's modulus is no longer sufficient to describe the entire curve representing stress evolution relative to strain which is not a simple straight line.

Moreover, it is dissipative: despite the damage which occurs in the material of the present invention, it is still possible to apply a load to the test-piece which maintains mechanical resistance. The elastic energy stored is gradually dissipated with the onset of damage in the test-piece. The curve representing load evolution relative to deflection is not a simple, monotonous straight line which suddenly ends, but it shows a slow, progressive decrease in load relative to deflection. This performance conveys slow, progressive decrease in the mechanical resistance of the material and a progressive decrease in the mechanical characteristics of the material: Young's modulus and ultimate stress. In addition, the fracture of the composite material of the present invention no longer involves its fragmentation, and it remains in a single piece showing cohesive behaviour.

Table 3 below groups together the mechanical characteristics obtained with biaxial bending tests using one same test-piece geometry both for pure boron carbide and for the material of the present invention in the case described in example 1, and table 4 below groups together the results of the biaxial bending tests with pure boron carbide and with the material of the present invention.

TABLE 3

| | Mechanical characteristics of the material | | |
|---|---|---|---|
| | Young's modulus $10^9$ Pa | Ultimate stress $10^6$ Pa | Elongation to fracture $10^{-6}$ Pa |
| $B_4C$ | 360 | 400 | 50 |
| $B_4C$ + 25% vHf (example 1) | 250 | 200 | 250 |

Figure 2:
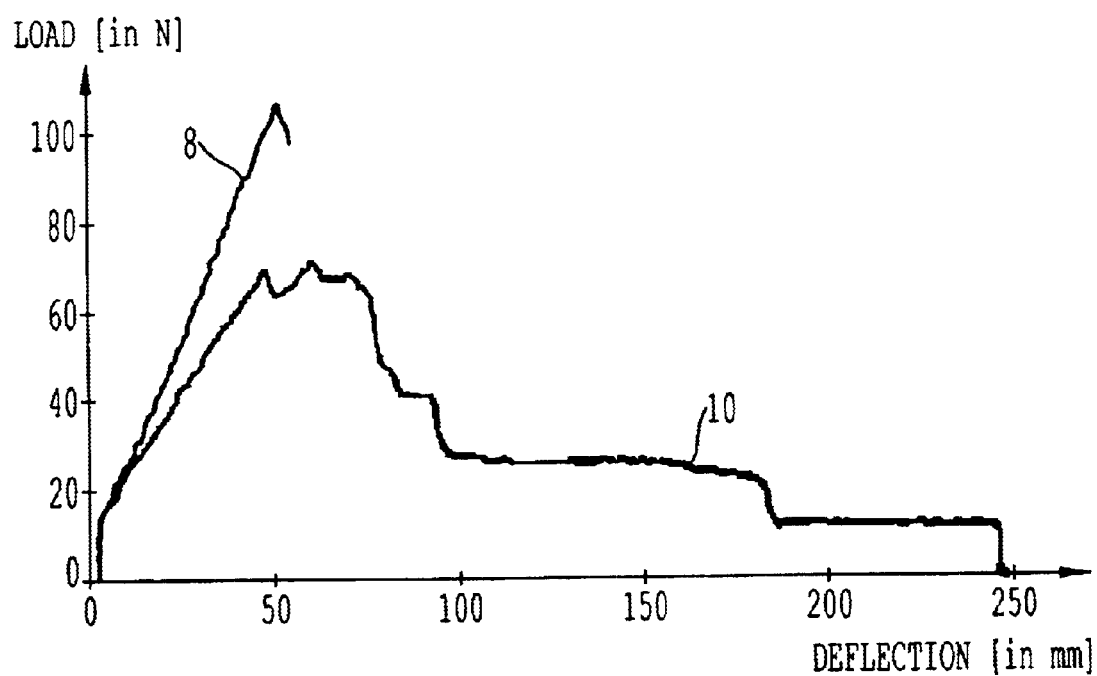
FIG. 2 is a graphical representation of the fracture behaviour of pure boron carbide and of a material of the present invention in the case in example 1.

FIG. 2 gives the results obtained so as to represent the changes in load applied to the test-piece in Newtons relative to the corresponding deflection expressed in microns up until total destruction of the test material for pure boron carbide: curve denoted 8, and for the material of the present invention: curve denoted 10. This figure shows the difference in fracture behaviour between pure boron carbide and the material of the present invention.

Curve 8 in particular shows the solely fragile behaviour of pure boron carbide. Curve 10 shows the pseudo-plastic, dissipative behaviour of the $B_4C$/Hf composite of the present invention.

Lowering of Young's modulus leads to lowering of the stresses undergone by the material subjected to imposed strain and therefore less demand is placed on the material in the event of degradation as set forth in the paragraph of the prior art.

Lowering of ultimate stress makes it possible to store less elastic energy during normal functioning of the material before breakage, and therefore the early onset of non-critical micro-cracks allows gradual dissipation of this mechanical energy without causing fragmentation of the material.

The substantial increase in elongation to rupture of the composite material of the present invention is a consequence of the first two changes in the mechanical properties of the material. The composite material is able to degrade slowly and progressively while maintaining very suitable mechanical integrity. Consequently, the composite material of the invention may undergo up to around tenfold more strain than a material of the prior art before it no longer shows any mechanical resistance. Even at this stage of severe degradation, the composite material of the invention, which no longer has any mechanical resistance, still remains in a single piece without fragmenting.

The $B_4C/Hf$ composite of the invention therefore shows better fracture behaviour than pure boron carbide.

EXAMPLE 4

Evaluation of Crack Propagation Resistance in a Material of the Invention

Toughness is the macroscopic magnitude characterizing a material's resistance to crack propagation. It is the critical value of the stress intensity factor calculated at a pre-crack made in the material under consideration. This pre-crack creates a critical defect of much greater size than that of any other defects naturally existing in the test-piece.

The double-torsion test chosen in our case consists of making a 3 mm cut in a rectangular plate (length 35 mm×width 17 mm×thickness 2 mm) and of tapering the tip of this cut by successive Knoop indentations along the median axis the length of the test-piece. The characteristics of the defect made must be as close as possible to those of a natural defect, in particular the curvature radius at the bottom of the cut must be very low. The crack is initiated under the point of application of the load starting from the pre-crack and extending along the axis of the test-piece.

The test consists of bending three points at the tip of the plate, of opening the crack to cause its propagation, controlling the applied stress and recording displacement under the tip of the cut. The plate is supported on four point rests, and the load is transmitted via another point rest at the tip of the pre-crack.

Test procedure consists of applying a bending force to the test-piece which increases at a constant rate (5 μm/min).

Measurement of the critical load Pc causing propagation of the crack is used to calculate toughness.

If the material so permits, blockages may occur during propagation of the crack after it has started to grow, that is to say if the previously defined toughness is exceeded at one point of the material.

Also, if the material so permits, local strengthening phenomena may occur vis-à-vis crack propagation. These phenomena indicate an increase in apparent toughness relative to the position of the tip of the crack at the time the crack starts to grow again when local toughness has been overcome. Therefore with the above-described double-torsion test, it is possible to plot a graph showing the evolution of apparent toughness calculated for each successive re-growth of the crack relative to the length of the crack developing in the double torsion test-piece.

The effect which involves an increase in apparent toughness relative to the length of the crack propagating in the material is called the R-curve effect, that is to say the ability of the material to resist crack propagation as and when a crack propagates. This R-curve effect may be identified by the previously described graph showing the development of toughness relative to the length of the crack.

Figure 3:
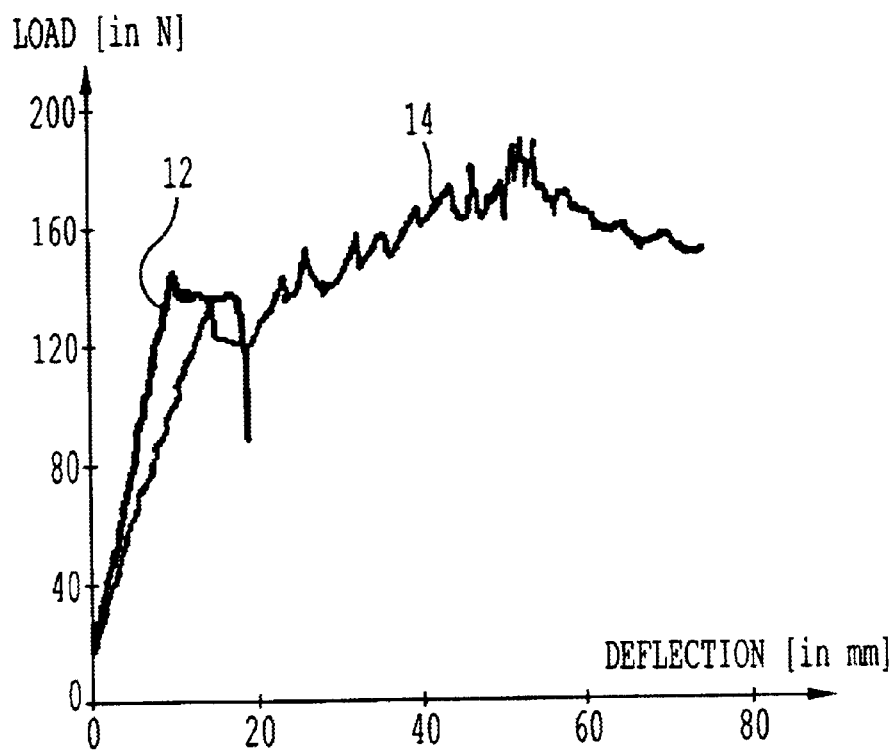
FIG. 3 is a graphical representation of the crack behaviour of pure boron carbide and of a composite $B_4C$/Hf material according to the present invention in the case described in example 1.

FIG. 3 gives the curves obtained during double-torsion tests showing the changes in load applied to the test-piece in Newtons relative to the corresponding deflection measured in microns up until total propagation of the crack in the test material for pure boron carbide: curve denoted 12, and for the material of the present invention: curve denoted 14. This figure shows the difference in crack behaviour between pure boron and the material of the present invention.

In particular, curve 14 exhibits the successive phenomena of crack blockage, expressing local strengthening in the $B_4C/Hf$ composite of the present invention. After blockage of the crack expressed by relaxing of the applied load, if crack propagation is to continue the applied load must be increased to cause further growth of the crack.

Curve 12 displays the instantaneous cracking of the material in pure boron carbide with no strengthening phenomena.

Figure 4:
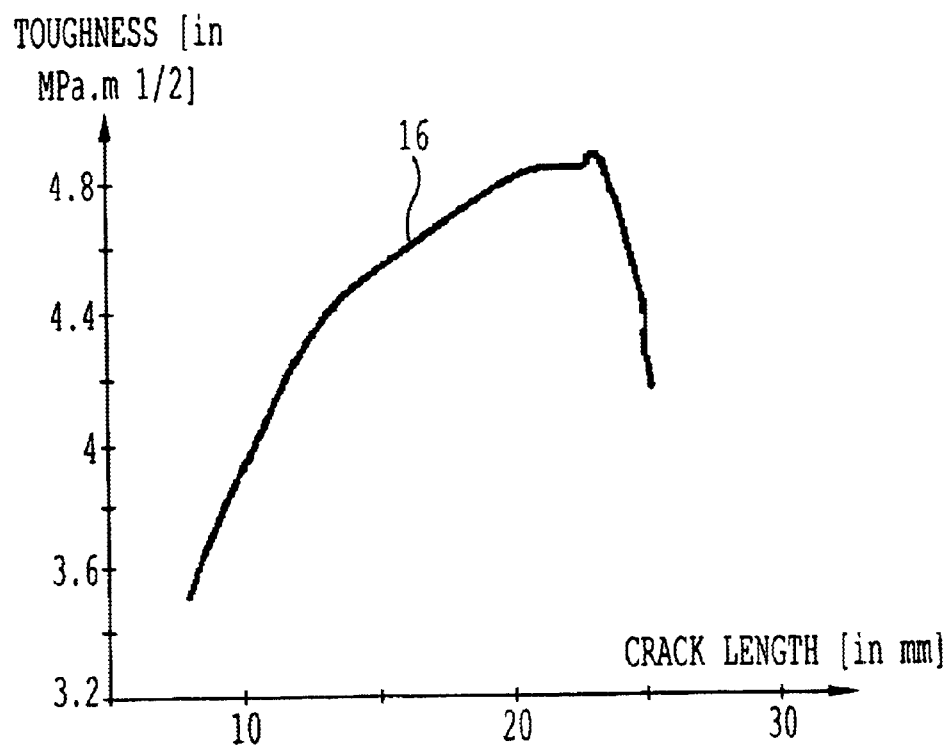
FIG. 4 is a graphical representation of the R-curve effect observed in the composite $B_4C$/Hf material of the present invention in the case described in example 1.

FIG. 4 shows curve 16 representing the development in apparent toughness of the composite material of the invention relative to the length of the crack which propagates in a double torsion test-piece. This bell-shaped curve demonstrates the R-curve effect which exists in the crack behaviour of the $B_4C/Hf$ composite of the present invention.

The increase in resistance to crack propagation of the composite material of the invention is in the order of 40% (increase in the resistance to crack propagation from 3.5 to 4.9 $Mpa.m^{1/2}$), when the crack propagates between ¼ and ¼ of test-piece length. When the length of the crack is too great relative to the length of the double-torsion test-piece (34 mm), resistance to crack propagation is reduced. This reduction corresponds to final destruction of the material.

The following table is a discrete representation of curve 16 shown in FIG. 4.

TABLE 4

| Crack length in mm | Apparent toughness in $Mpa.m^{½}$ |
|---|---|
| 8.0 | 3.5 |
| 9.0 | 3.7 |
| 12.2 | 4.3 |
| 13.9 | 4.4 |
| 17.5 | 4.6 |
| 20.7 | 4.8 |
| 23.0 | 4.8 |
| 23.2 | 4.9 |
| 23.7 | 4.9 |
| 25.2 | 4.4 |
| 25.2 | 4.3 |
| 25.5 | 4.1 |

Micrograph analysis shows the difference in fracture and crack behaviour firstly of pure boron carbide and secondly of the composite material of the invention.

In particular, it shows the fragmentation of the pure boron carbide, whereas despite the propagation of cracks in the composite material of the present invention, the latter remains in a single piece and is not fragmented.

Table 5 below shows the measurements made by the double-torsion test of the toughness of pure boron carbide and of the composite material $B_4C/Hf$ according to the invention in the case of example 1.

TABLE 5

| | Material toughness |
|---|---|
| Materials | KIC toughness $10^6 Pa.m^{0.5}$ |
| Boron carbide $B_4C$ | 3.5 |
| B4C/Hf composite | 5.0 |

The $B_4C/Hf$ composite of the invention shows resistance to crack propagation which increases as the cracks propagate. The crack behaviour of the $B_4C/Hf$ composite of the present invention therefore shows an R-curve effect.

The $B_4C/Hf$ composite of the invention exhibits greater toughness than the toughness of pure boron carbide.

The B$_4$C/Hf composite of the invention therefore displays better crack behaviour than pure boron carbide.

What is claimed is:

1. Process for manufacturing a neutron absorbent material, said material being a composite material containing boron carbide and hafnium, comprising the following steps:

adding hafnium powder to a powder of boron carbide, mixing the boron carbide powder and the hafnium powder such as to obtain a homogeneous mixture, and sintering the homogeneous mixture at sufficient sintering pressure and temperature to obtain a composite material, wherein the sintering pressure is applied before the temperature of the homogeneous mixture of the powders reaches the sinter reaction temperature of said mixture, and wherein the mixture of boron carbide and hafnium powders is made by applying ultrasound to a paste containing said powders dispersed in a dispersion liquid.

2. Process according to claim 1, in which up to approximately 40% by volume of hafnium is added, the homogeneous mixture of the boron carbide and hafnium powders representing 100% by volume.

3. Process according to claim 1, in which approximately 25% by volume of hafnium is added, the homogeneous mixture of the boron carbide and hafnium powders representing 100% by volume.

4. Process according to claim 1, in which the grain size of the boron carbide powder ranges up to approximately 50 μm.

5. Process according to claim 1, in which the grain size of the hafnium powder ranges up to approximately 20 μm.

6. Process according to claim 1, in which the grain size of the hafnium powder ranges up to approximately 10 μm.

7. Process according to claim 1, in which the homogeneous mixture is sintered in a vacuum or in an atmosphere formed of a neutral gas.

8. Process for manufacturing a neutron absorbent material, said material being a composite material containing boron carbide and hafnium, comprising the following steps:

adding hafnium powder to a powder of boron carbide, mixing the boron carbide powder and the hafnium powder such as to obtain a homogeneous mixture, and sintering the homogeneous mixture at sufficient sintering pressure and temperature to obtain a composite material, wherein the sintering pressure is applied before the temperature of the homogeneous mixture of the powders reaches the sinter reaction temperature of said mixture, in which the homogeneous mixture is sintered in a graphite mould lined with a graphite sheet.

9. Process for manufacturing a neutron absorbent material, said material being a composite material containing boron carbide and hafnium, comprising the following steps:

adding hafnium powder to a powder of boron carbide, mixing the boron carbide powder and the hafnium powder such as to obtain a homogeneous mixture, and sintering the homogeneous mixture at sufficient sintering pressure and temperature to obtain a composite material, wherein the sintering pressure is applied before the temperature of the homogeneous mixture of the powders reaches the sinter reaction temperature of said mixture, in which the mixture is sintered at a temperature of approximately 1800° C. to 2100° C., at a pressure of around 70 to 110 MPa for a period of approximately 15 to 90 minutes.

10. Process for manufacturing a neutron absorbent material, said material being a composite material containing boron carbide and hafnium, comprising the following steps:

adding hafnium powder to a powder of boron carbide, mixing the boron carbide powder and the hafnium powder such as to obtain a homogeneous mixture, and sintering the homogeneous mixture at sufficient sintering pressure and temperature to obtain a composite material, wherein the sintering pressure is applied before the temperature of the homogeneous mixture of the powders reaches the sinter reaction temperature of said mixture, in which the mixture is sintered at a temperature of approximately 2000° C., at a pressure of around 92 MPa for a period of approximately 1 hour.

* * * * *